Dec. 10, 1963 W. J. HOLT, JR 3,113,463
INERTIAL ANGULAR VELOCITY SENSING INSTRUMENT
Filed June 8, 1960 6 Sheets-Sheet 1
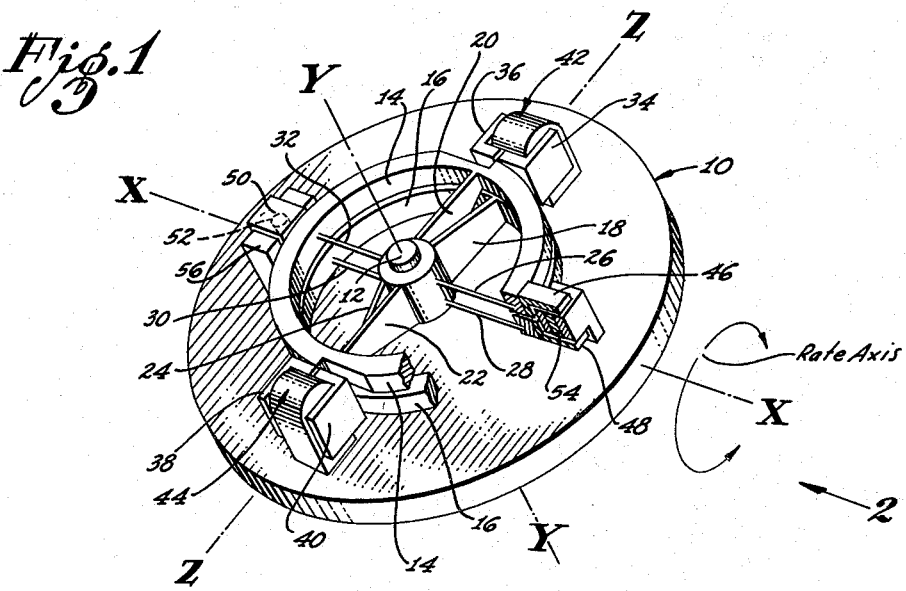
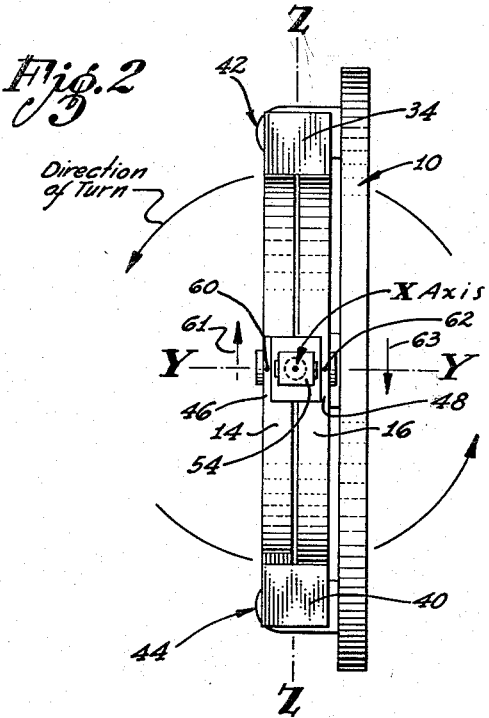
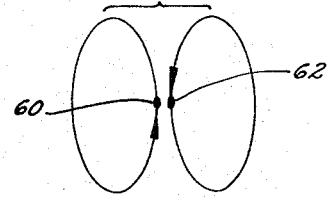
INVENTOR:
William J. Holt, Jr.
By Smyth & Roston
Attorneys Dec. 10, 1963 W. J. HOLT, JR 3,113,463
INERTIAL ANGULAR VELOCITY SENSING INSTRUMENT
Filed June 8, 1960 6 Sheets-Sheet 2

INVENTOR:
William J. Holt, Jr.

By Smyth & Roston
Attorneys

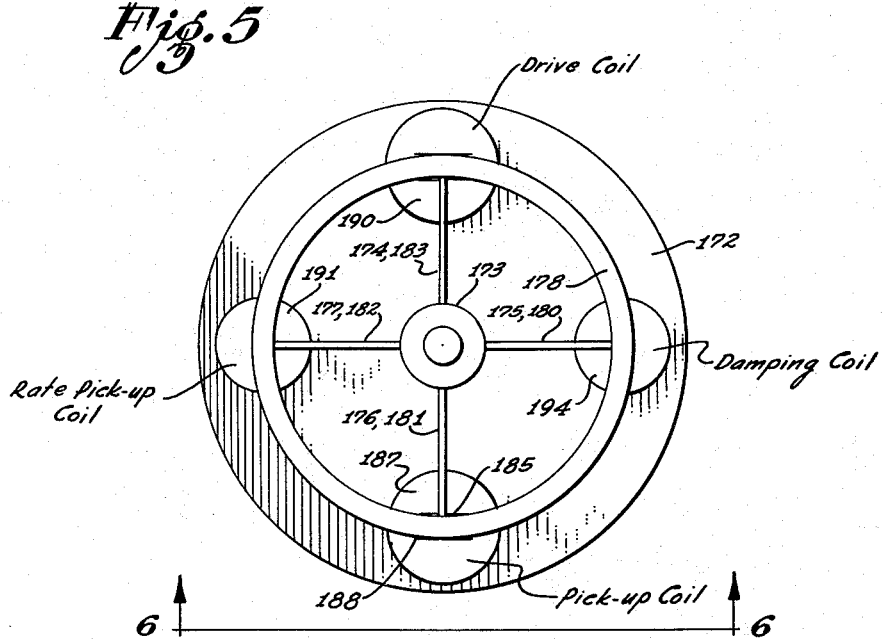
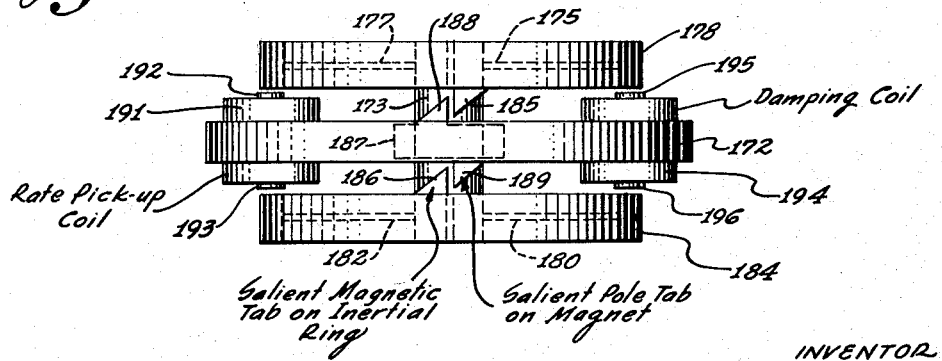

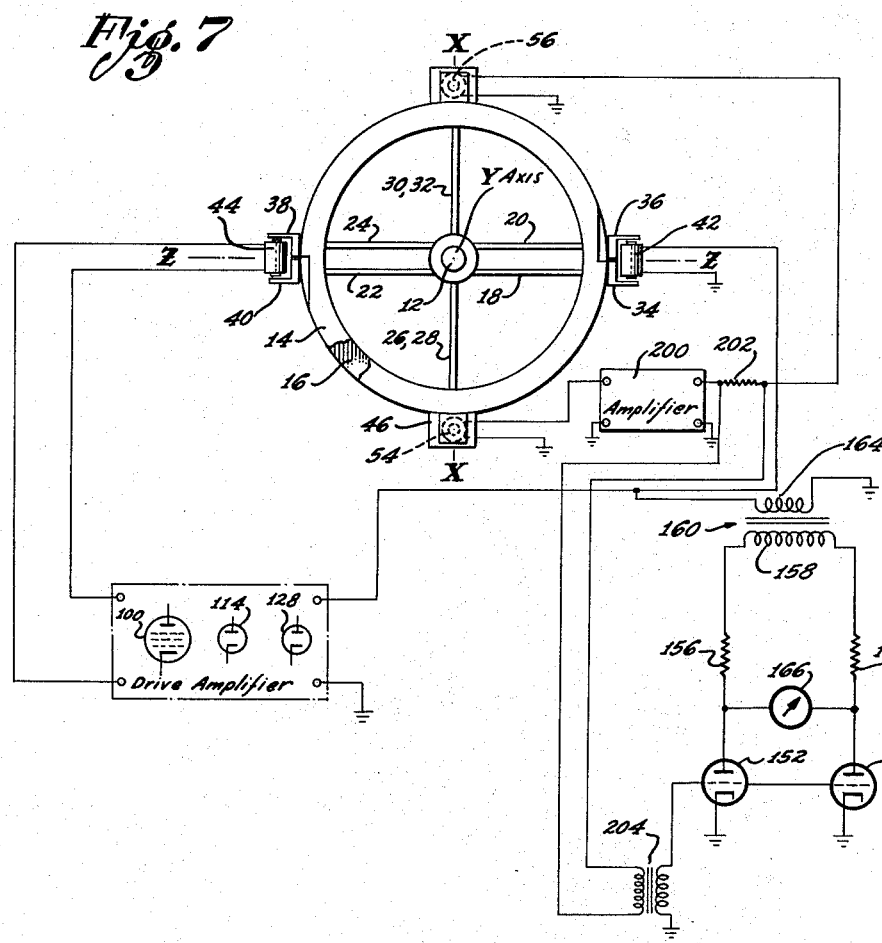

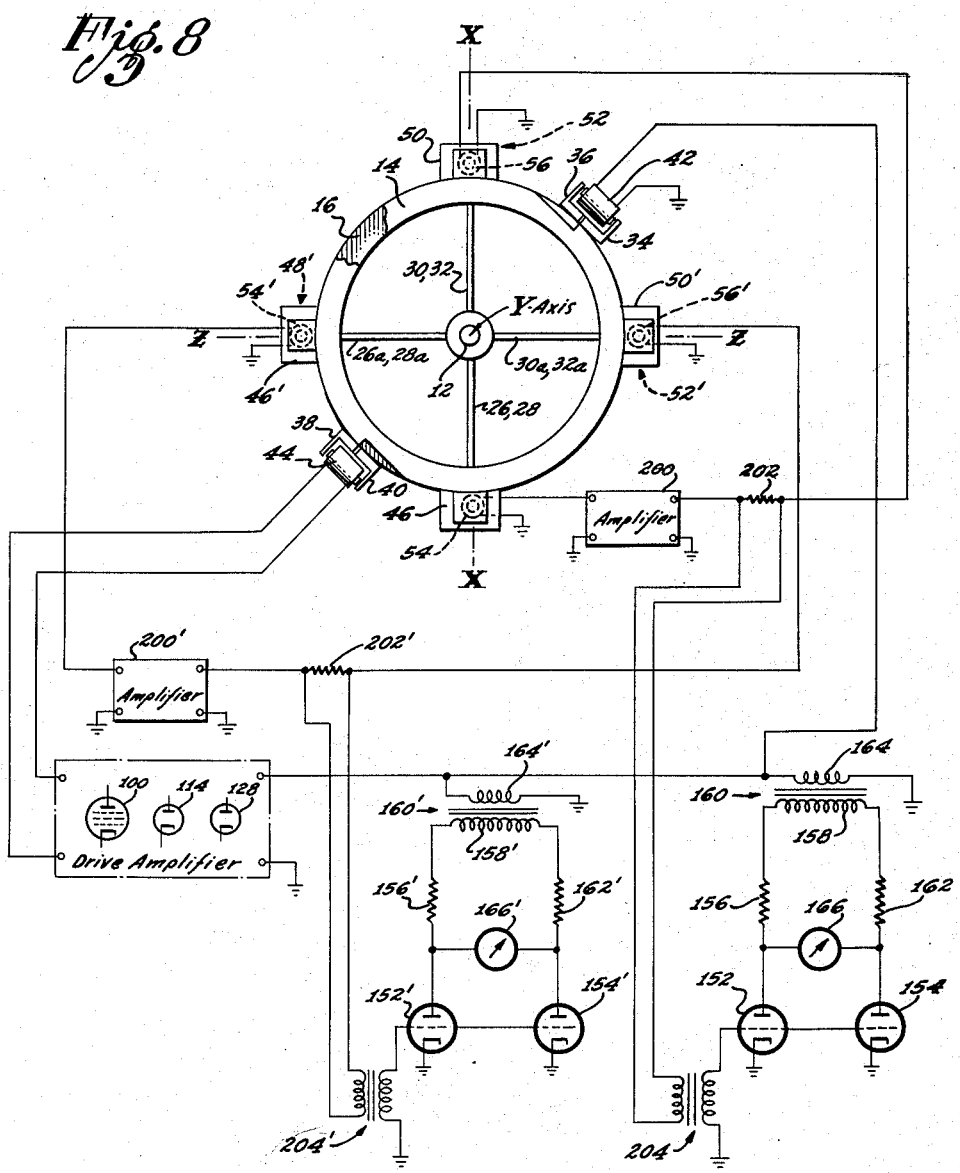

Dec. 10, 1963  W. J. HOLT, JR  3,113,463
INERTIAL ANGULAR VELOCITY SENSING INSTRUMENT
Filed June 8, 1960  6 Sheets-Sheet 6

INVENTOR:
William J. Holt, Jr.

By Smyth, Roston & Pavitt
Attorneys

United States Patent Office 3,113,463
Patented Dec. 10, 1963

---

3,113,463
INERTIAL ANGULAR VELOCITY SENSING INSTRUMENT
William J. Holt, Jr., Los Angeles, Calif., assignor, by mesne assignments, to The United States Time Corporation, Middlebury, Conn., a corporation of Connecticut
Filed June 8, 1960, Ser. No. 35,862
19 Claims. (Cl. 73—505)

This is a continuation-in-part application of Serial No. 620,258, filed November 5, 1956, by William J. Holt, Jr. for Inertial Angular Velocity Sensing Instrument, now forfeited.

The invention relates to apparatus and systems for sensing or measuring inertial angular velocity. More particularly, the invention is concerned with an improved vibratory rate gyroscope.

For many, many years, the usual rotating mass type of rate gyroscope has been the only practical instrument for measuring inertial angular velocities. Although instruments of this general type are generally satisfactory, they are subject to several limitations. For example, these prior art instruments require delicate bearings with the initial and maintenance expenses attendant to such bearings. The prior art instruments also require a precisely controlled three-phase alternating-current exciting source. In general, the prior art instruments are expensive and delicate, and, for the most part, they are relatively complicated and require a high degree of skill and dexterity in their operation and maintenance.

A vibratory type of rate gyroscope, which, as its name implies, uses vibrating rather than rotating masses, has been proposed for the measurement of inertial angular velocity. This latter type of instrument is not subject to some of the drawbacks encountered in the rotating mass type of rate gyroscope discussed above. However, a major difficulty encountered in prior art vibratory types of rate gyroscopes is the fact that they have been found to be relatively sensitive to extraneous shocks and vibrations. Such extraneous vibrations have a tendency to set up spurious vibrations in the instrument which produce erroneous readings. The present invention is directed to improved gyroscope apparatus and system of the vibratory type but which does not suffer from the inherent drawbacks of the prior art vibratory instruments.

More specifically, the present invention provides an improved vibratory gyroscope for the measurement of inertial angular velocity which is insensitive to external shocks, which does not require bearings of any type, and which does not require a precisely stabilized alternating current energy source.

The instrument of the invention develops its own precision alternating current driving voltage from a direct current source. This feature enables an instrument additionally to be used as a source of precision energy for other instruments in the installation in which the instrument may be utilized.

An important feature of the gyroscope of the invention is the fact that it is dynamically balanced. This means that the instrument operates satisfactorily in the presence of external shocks and vibrations along or about any axis. Such external shocks and vibrations have no material effect on the indicating or sensing ability of the instrument. This feature enables the instrument to be used in aircraft and other vehicles without impairing its accuracy.

The immunity of the instrument to external disturbances is for the most part a result of its mechanical construction. However, the apparatus is susceptible to a simple electromagnetic damping arrangement which, in a manner to be described, reduces to an absolute minimum the response of the instrument to external influences.

The apparatus of the invention includes a pair of masses which are supported for out-of-phase angular vibration about a common axis. The vibratory portion of the apparatus is of the same general type as that disclosed and claimed in copending application Serial No. 617,468, filed October 22, 1956, now Patent No. 2,939,971, in the name of the present inventor. The masses are preferably driven at the natural mechanical resonant frequency of the vibratory apparatus, and the apparatus generates an alternating current output signal that, not only is used to sustain the vibrational oscillations of the masses, but which, as previously noted, may also provide a precisely stabilized low-frequency source of electrical energy for other instruments and control equipment.

Further features of this invention pertain to provision of non-magnetic annular members having internal magnetic tabs and transducers for vibrating the members and for sensing the vibration of said member. By enclosing the tabs and transducers in the annular members, a highly compact arrangement is provided.

Other features and advantages of the present invention will become apparent from the following description, particularly when taken in connection with the accompanying drawings, in which—

FIGURE 1 is a somewhat schematic, perspective view of one embodiment of the inertial angular velocity sensing instrument of the invention and which includes a pair of angularly vibrating masses;

FIGURE 2 is a side elevational view of the unit of FIGURE 1 looking along the axis indicated "X" in FIGURE 1 and with the axis indicated "Z" in FIGURE 1 extending upwardly in the plane of the paper;

FIGURE 3 is a schematic representation of the paths of a pair of points on respective ones of the angularly vibrating masses of FIGURE 1, this representation being useful in explaining the operation of the instrument of the invention;

FIGURES 5 and 6 are respectively a top plan view and a side elevational view, somewhat schematic in form, of a second embodiment of the angular velocity sensing instrument of the invention;

FIGURE 7 is a schematic illustration of a modified control system for the instrument of FIGURES 1 and 2;

FIGURE 8 is a further modification of the invention in which a single instrument may perform a dual function;

Figure 9:
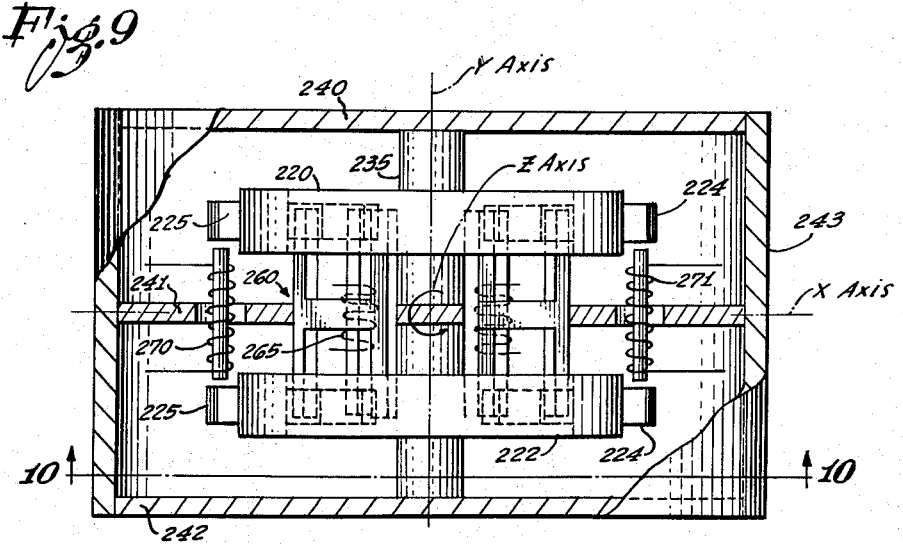
Figure 10:
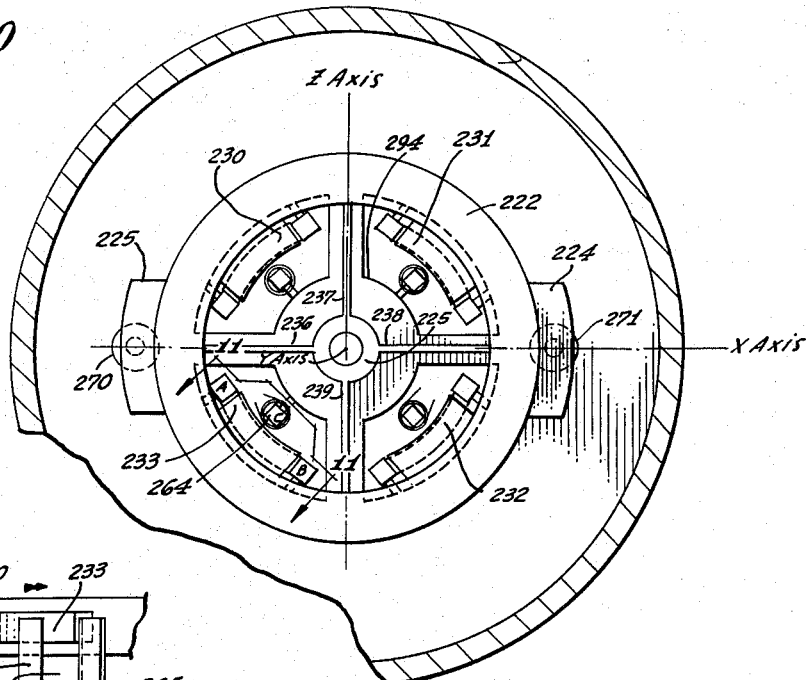
Figure 11:
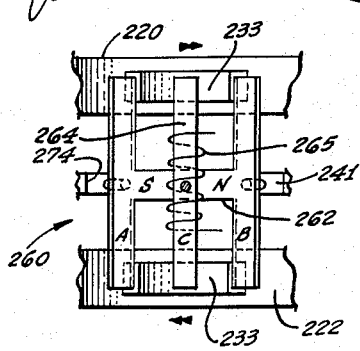

FIGURES 9 and 10 are respectively a side elevational view and a top plan view, somewhat schematic in form, of a third embodiment of the angular velocity sensing instrument of the invention; and FIGURE 11 is a view taken along the lines 11—11 of FIGURE 10 illustrating the transducer means utilized in the instrument of FIGURES 9 and 10.

With reference now in particular to FIGURES 1 and 2, the illustrated instrument includes a base 10. A hub 12 is rigidly mounted on the base, and the hub extends along an axis "Y" perpendicularly outwardly from the plane of the base. A pair of annular members 14 and 16 (composed, for example, of beryllium copper) constitute the vibratory masses. These members are supported from the hub by four tapered resilient metallic spokes 18, 20, 22 and 24. The annular members are supported by the spokes coaxial with the "Y" axis, and these members are spaced axially from one another. The spokes and the annular members are preferably composed of a non-magnetic material such as beryllium copper.

The spokes 20 and 22 are firmly fastened to the hub 12, and they extend radially from the hub in diametrically opposite directions. These spokes are affixed to the top annular member 14 as by welding or brazing. The spokes 18 and 24 are also secured to the hub 12, and these latter spokes extend from the hub adjacent respective ones of the spokes 20 and 22 to the bottom annular member 16. The spokes 18 and 24 are affixed to the lower annular member 16 as by welding or brazing. The spokes are positioned so that their greater transverse dimension extends upwardly from the plane of the base 10. The spokes extend generally along an axis indicated "Z" in FIGURE 1; the spokes 18 and 22 being on one side of this axis, and the spokes 20 and 24 being on the other.

The annular members 14 and 16 do not touch one another at any point, and they are free to rotate to a limited extent about the "Y" axis. To assure that the annular members 14 and 16 will be maintained centered on the "Y" axis of the hub 12, four radial rod-like stabilizing members 26, 28, 30 and 32 are provided. These stabilizers also may be composed of beryllium copper. The stabilizers are fastened to the hub 12, and they extend radially from the hub to respective ones of the annular members 14 and 16 along an axis "X" perpendicular to "Y" and "Z" axes.

The stabilizers 26 and 32 extend in diametrically opposite directions from the hub 12, and their outer ends are welded or brazed to the annular member 14. The stabilizers 28 and 30 also extend radially and in diametrically opposite directions directly opposite respective ones of the stabilizers 26 and 32. The stabilizers 28 and 30 are also welded or brazed to the annular member 16.

The stabilizers are also formed of resilient material such as beryllium copper, but they constitute weak springs as compared with the flat spokes 18, 20, 22 and 24 insofar as angular rotation of the members 14 and 16 is concerned. The stabilizers, however, are strong in tension and maintain the annular members 14 and 16 precisely centered on the hub 12 in the presence of external shocks and vibrations occurring along the "X" axis.

With the illustrated construction, and assuming that the base 10 and the hub 12 are held stationary, the annular members 14 and 16 are free to oscillate to a limited extent about the "Y" and "Z" axes. However, the annular members are rigidly held against oscillation about the "X" axis by the configuration of the spokes 18, 20, 22 and 24.

Four tabs 34, 36, 38 and 40, composed of magnetic material such as iron or steel, are affixed to the annular members 14 and 16. The tabs 34 and 36 are fastened (as by welding) to respective ones of the annular members, and these tabs are positioned on opposite sides of the "Z" axis in spaced parallel relation. The tabs 38 and 40 are also welded to respective ones of the annular members 14 and 16, and these latter tabs are positioned diametrically opposite the tabs 34 and 36. The tabs 38 and 40 are also mounted in spaced parallel relation on opposite sides of the "Z" axis. The tabs 34, 36, 38 and 40 lie in planes essentially parallel to the plane defined by the "Y"—"Z" axes. These tabs are placed as closely as possible to the "Z" axis so that they will not interfere to any noticeable extent with the mode of vibration of the annular members 14 and 16 about that axis.

An electro-magnetic transducer drive assembly 42 is mounted on the base 10, and this transducer is positioned between the tabs 34 and 36. The transducer may include a permanent magnet core (composed, for example, of Alnico 5) for biasing purposes, and it has an energizing winding wound around that core. This core defines respective air gaps between its ends and the tabs 34 and 36. When an alternating current is passed through the winding of the transducer, half cycles of one polarity only of the current are effective, because the permanent magnet core opposes and cancels the effect of the other half cycles. The permanent magnet core therefore functions as a biasing means and enables alternating current in the energizing winding to cause the electro-magnetic drive assembly to draw the tabs 34 and 36 back and forth at the frequency of this current. The drive assembly 42 is positioned squarely between the tabs 34 and 36, with the air gaps between its core and the tabs being long enough to allow the tabs to oscillate freely.

Since the tab 34 is fastened to the top annular member 14 and the tab 36 is fastened to the bottom annular member 16, the two annular members vibrate angularly and in opposition about the "Y" axis when the electromagnetic drive assembly 42 is energized in the manner described above.

An electromagnetic transducer pick-up assmbly 44 is also mounted on the base 10. This latter transducer is positioned between the tabs 38 and 40 so as to provide respective air gaps between the ends of its core and each of the tabs. The latter assembly also includes an energizing winding wound on a core of suitable permanent magnet material such as, for example, Alnico 5.

When the annular members 14 and 16 are caused to vibrate angularly and in opposition about the "Y" axis by the transducer drive assembly 42, as described above, the tabs 38 and 40 move to open and close the air gaps between the tabs 38 and 40 and the core of the electromagnetic pick-up assembly 44. This motion of the tabs alters the magnetic flux linkage through the winding of the assembly 44 from the core. This causes an alternating voltage output signal to be generated across the output terminals of this assembly in accordance with well-known electromagnetic principles.

Figure 4:
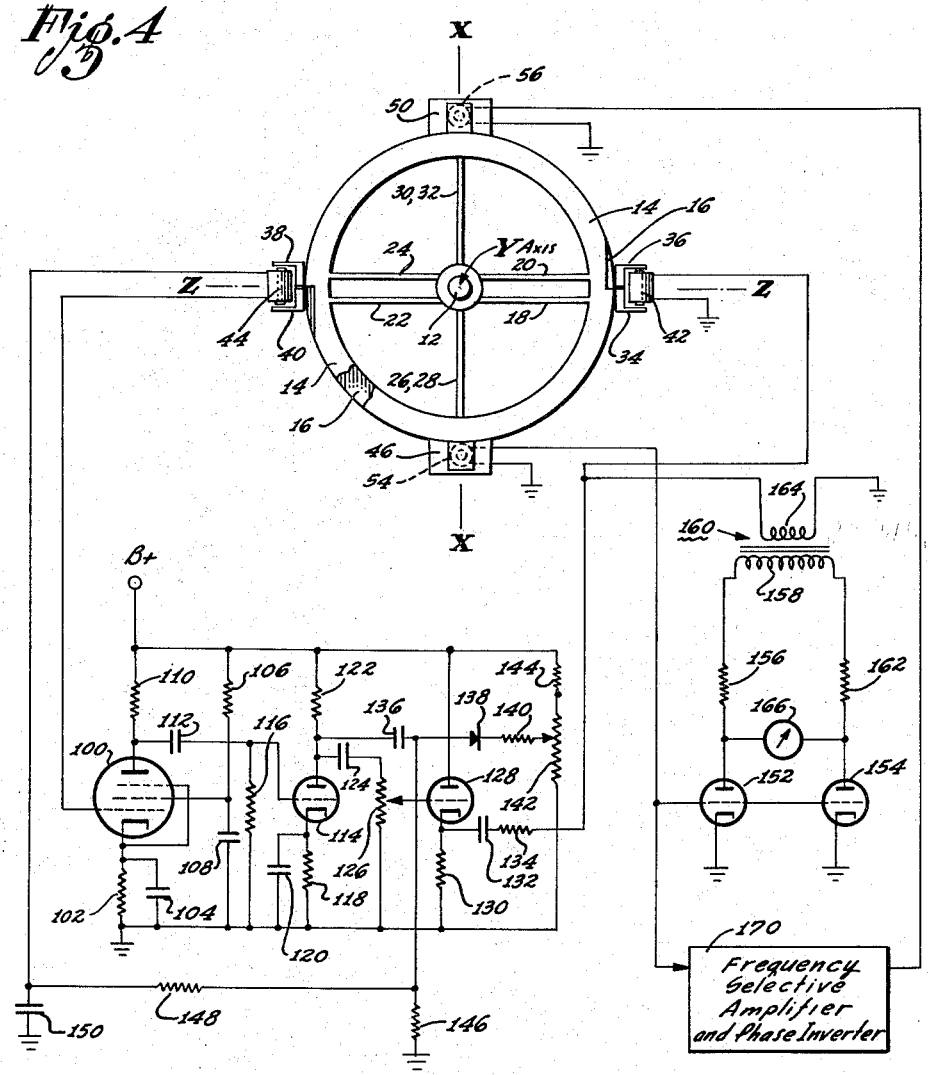
FIGURE 4 is a schematic illustration of an electric control system for the angular velocity sensing instrument of FIGURES 1 and 2.

In a manner to be described in conjunction with FIGURE 4, the output signal developed across the output terminals of the pick-up assembly 44 is used to control the excitation of the transducer drive assembly 42. This control is preferably such that the annular members 14 and 16 oscillate in out-of-phase relation about the "Y" axis at the natural resonant frequency of the apparatus.

The natural resonant frequency of the vibratory apparatus is a function of the spring constant of the flat spokes 18, 20, 22 and 24; and of the moment of inertia of the annular members 14 and 16 about the "Y" axis. It is preferred that the annular members 14 and 16 be thinner in their radial dimension than in their axial dimension so that as much mass as possible is disposed at their peripheries. With these factors in mind, the instrument can be accurately designed to have a desired natural mechanical resonant frequency, and, as noted above, the instrument is preferably driven at this frequency.

Four additional magnetic tabs 46, 48, 50 and 52 are welded or otherwise fastened to the annular members 14 and 16. These additional tabs, like the previous ones, are composed of suitable magnetic material such as iron or steel.

The tab 46 is affixed to the annular member 14 and the tab 48 is affixed to the annular member 16. These tabs are axially aligned with the stabilizers 26, 28, 30 and 32, and they lie on opposite sides of the "X" axis. The tabs 46 and 48 are mounted in spaced parallel relation, and they lie in planes parallel to the plane of the "X"—"Z" axes. The tabs 50 and 52 are respectively affixed to the annular members 14 and 16, and these tabs are also axially aligned with the stabilizers, and they are diametrically opposite the tabs 46 and 48. The tabs 50 and 52, likewise, lie on opposite sides of the "X" axis. The tabs 50 and 52 also lie in planes parallel to the plane defined by the "X"—"Z" axes, and these tabs are spaced from one another.

An electromagnetic transducer pick-up assembly 54 is mounted on the base 10, and this assembly is positioned between the tabs 46 and 48. The core of the pick-up assembly 54 has its respective ends spaced from the tabs 46 and 48 to form air gaps between the core and the tabs. This core of the pick-up assembly is formed of suitable permanent magnet material such as Alnico 5. A usual energizing winding is wound around the core. An alternating voltage output signal is, therefore, developed across the output terminals of the transducer pick-up assembly in response to movements of the tabs 46 and 48 back and forth in the air gaps and corresponding to the component of angular motion of the annular members 14 and 16 about the "Z" axis.

An electromagnetic transducer damper assembly 56 is mounted on the base 10. This latter transducer assembly is positioned between the tabs 50 and 52, and it is connected in a manner to be described to damp undesired components of oscillation of the annular members 14 and 16 about the "Z" axis.

When the annular members 14 and 16 are oppositely vibrating about the "Y" axis, it is evident that gyroscopic forces will be developed by the annular members if the apparatus is rotated about the "Z" axis or about the "X" axis. The spokes 18, 20, 22 and 24 of the illustrated apparatus are constructed and positioned so that the annular members 14 and 16 are susceptible to being displaced from their neutral positions for gyroscopic forces about the "Z" axis, but the annular members are held securely in their neutral positions by the configuration of the spokes for gyroscopic forces about the "X" axis.

In the view of FIGURE 2, and as noted previously, the "X" axis of the apparatus is turned up to be perpendicular of the plan of the paper and the "Y" and "Z" axes are as shown. Assuming that the instantaneous direction of angular movement of the annular member 14 about the "Y" axis to be such that a point 60 on the tab 46 is moving in the direction shown by the arrow 61 and up in FIGURE 2, then the instantaneous direction of angular movement of the annular member 16 at this moment will be such that a point 62 on the tab 48 will be moving down in FIGURE 2 as shown by the arrow 63.

Now, if we assume a counter-clockwise rotation of the vibrating apparatus about the "X" axis, the gyroscopic forces set up will cause the annular member 14 to precess so that the point 60 is moved to the right in FIGURE 2 and towards the point 62. These gyroscopic forces also cause the annular member 16 to precess so that the point 62 is moved to the left in FIGURE 2 and towards the point 60. Therefore, the points 60 and 62 move towards each other for one-half of each cycle of oscillation of the annular members 14 and 16 about the "Y" axis.

During the next half of each cycle of oscillation of the annular members 14 and 16 about the "Y" axis, the direction of rotation of the annular members reverses and the points 60 and 62 move away from each other in FIGURE 2. Therefore, for each complete oscillatory cycle of the annular members 14 and 16 about the "Y" axis, rotation of the apparatus about the "X" axis causes the paths of the points 60 and 62 to be elliptical as shown in FIGURE 3. The length of the minor axis of each of the ellipses is proportional to the rate of turn of the device about the "X" axis. It should be clear that the direction of rotation of the points 60 and 62 along their respective elliptical paths will reverse when the turn of the vibrating assembly about the "X" axis is in a clockwise rather than a counter-clockwise direction.

The amplitude of the alternating voltage output signal developed across the electromagnetic transducer pick-up assembly 54 depends upon the components of vibrational motion of the tabs 46 and 48 in a direction corresponding to the minor axes of the ellipses of FIGURE 3. The amplitude of this output signal, therefore, is a measure of the rate of turn of the apparatus about the "X" axis. That is, the electromagnetic transducer pick-up assembly 54 develops an output signal having a frequency corresponding to the angular vibrational frequency of the annular members 14 and 16 about the "Y" axis, and having an amplitude proportional to the rate of turn of the vibrating apparatus about the "X" axis. Also, this output signal has a phase determined by the direction of turn of the apparatus about the "X" axis.

The component of motion of the points 60 and 62 along the major axes of their elliptical paths does not contribute to the voltage generated by the assembly 54. This is because the net air gap between the tabs 46 and 48 and the assembly 54, and consequently the net flux density in the magnetic circuit, remains essentially unchanged for this component of motion. Therefore, if the above-described instrument is mounted in a vehicle, an accurate measurement or indication of the inertial angular velocity, or rate of turn, of the vehicle about the "X" axis can be obtained by utilizing the output signal from the transducer assembly 54.

Reference is now made to FIGURE 4, which illustrates a typical control and utilization system for the instrument of FIGURES 1 and 2. The illustrated system utilizes the output signal from the electromagnetic pick-up transducer 44 to introduce an input signal to the electromagnetic drive transducer assembly 42 of the proper frequency to sustain oscillation in the apparatus at the resonant frequency. Also, the system utilizes the output signals from the electromagnetic pick-up transducer assembly 54 to obtain a measurement of the rate of turn of the apparatus about the "X" axis. The system also introduces damping signals to the electromagnetic damping assembly 56 to inhibit undesired mechanical oscillations in the apparatus.

It should be pointed out that although electromagnetic pick-up and drive transducer assemblies are shown, other transducers can be used. For example, equivalent optical, capacitive and other types of assemblies could be used to derive the various control signals.

One terminal of the electromagnetic pick-up assembly 44 is connected to the control grid of a vacuum tube, such as a pentode 100. The cathode of this vacuum tube is connected to a grounded resistor 102, and the resistor is shunted by a capacitor 104. The screen grid of the tube is connected to a resistor 106, which, in turn, is connected to the positive terminal B+ of a source of direct voltage. The screen grid is by-passed to ground for alternating currents by means of a capacitor 108 connected between it and a point of reference potential or ground. The suppressor grid of the pentode is connected to the cathode, and its anode is connected to the positive terminal B+ through a resistor 110.

A coupling capacitor 112 is connected between the anode of the pentode 100 and the control grid of a vacuum tube, such as a triode 114. The control grid of the triode is connected to ground through a resistor 116. A resistor 118 connects the cathode of the triode to ground, and this resistor is shunted by a capacitor 120. The anode of the triode 114 is connected through a load resistor 122 to the positive terminal B+, and the anode is further connected to a capacitor 124.

The other terminal of the capacitor 124 is connected to one of the fixed contacts of a potentiometer 126. The other fixed contact of the potentiometer is connected to ground, and the movable arm of the potentiometer is connected to the control grid of a vacuum tube, such as a triode 128. This tube is connected as a cathode follower. A load resistor 130 connects the cathode of the triode 128 to ground, and its anode is connected directly to the positive terminal B+.

A coupling capacitor 132 and a series resistor 134 couples the cathode of the tube 128 to one terminal of the electromagnetic transducer drive assembly 42. The other terminal of this drive assembly is connected to ground.

The anode of the triode 114 is also connected to a capacitor 136 which, in turn, is connected to the anode of a diode 138. The diode is connected as an automatic volume control (A.V.C.) circuit, and its cathode is connected through a resistor 140 to the movable arm of a potentiometer 142. One of the fixed contacts of the potentiometer is connected through a resistor 144 to the positive terminal B+, and its other fixed contact is connected to ground. The common junction of the capacitor 136 and the diode 138 is connected through a resistor 146 to ground, and the A.V.C. voltage appears across this resistor.

The other terminal of the pick-up transducer assembly 44 is connected to the common junction of the resistor 146 and the diode 138 through a resistor 148, and a capacitor 150 is connected between this terminal of the transducer and ground. The resistor 148 and the capacitor 150 function as a filter network.

The vacuum tubes 100 and 114 function as an amplifier for the output signal appearing across the output terminals of the pick-up transducer assembly 44 in response to relative angular vibration of the members 14 and 16 about the "Y" axis. The signal is amplified in the amplifier, and it is introduced to the electromagnetic transducer drive assembly 42 through the cathode follower 128. The amplified signal has the proper phase to produce angular vibrations of the members 14 and 16 of the proper timing to augment the output signal from the transducer 44.

As is well known, vibrations of the annular members 14 and 16 about the "Y" axis occur with maximum amplitude at the natural resonant frequency of the apparatus. Therefore, the system has an inherent tendency to drive the vibratory elements 14 and 16 at their resonant frequency.

The gain of the translated signal can be controlled manually by adjusting the movable arm of the potentiometer 126. This gain is adjusted to a point at which the vibratory elements 14 and 16 are driven at normal amplitude about the "Y" axis. The circuit of the diode 138 derives an A.V.C. voltage from the output signal from the triode 114. As previously noted, an A.V.C. voltage is established across the resistor 146, and this voltage is impressed through the filter 148, 150 and through the pick-up transducer assembly 44, onto the control grid of the pentode 100.

The automatic volume control circuit assures that the amplifier will operate with maximum gain when it is first energized so as to provide a rapid response for the system. It has been found in a constructed embodiment of the invention that when the system is first turned on the vibratory elements 14 and 16 build up their oscillations about the axis "Y" and reach their working amplitude at resonant frequency within the space of one second.

In the constructed embodiment of the invention, the following values were used, and these are listed merely by way of example:

| | | |
|---|---|---:|
| Tube 100 | | 6BA6 |
| Tubes 114 and 128 | | 12AT7 |
| Capacitor 150 | microfarads | .1 |
| Resistor 102 | ohms | 270 |
| Capacitor 104 | microfarads | 10 |
| Resistor 148 | kilo-ohms | 470 |
| Resistor 110 | do | 100 |
| Capacitor 112 | microfarads | .1 |
| Resistor 106 | kilo-ohms | 47 |
| Capacitor 108 | microfarads | .1 |
| Resistor 116 | kilo-ohms | 470 |
| Capacitor 120 | microfarads | 10 |
| Resistor 118 | ohms | 270 |
| Resistor 122 | kilo-ohms | 20 |
| Capacitor 124 | microfarads | .1 |
| Potentiometer 126 | kilo-ohms | 0–470 |
| Capacitor 136 | microfarads | .1 |
| Resistor 146 | Kilo-ohms | 470 |
| Resistor 130 | do | 5 |
| Capacitor 132 | microfarads | .1 |
| Resistor 134 | kilo-ohms | 10 |
| Diode 138 | | 1N34 |
| Resistor 140 | kilo-ohms | 47 |
| Resistor 144 | do | 470 |
| Potentiometer 142 | do | 0–100 |

One terminal of the electromagnetic pick-up transducer assembly 54 is connected to ground and the other terminal of the transducer is connected to the control grid of a triode 152 and to the control grid of a triode 154. The cathodes of these triodes are connected to ground.

The triodes are connected as a phase-sensitive amplifier, the anode of the triode 152 being connected through a resistor 156 to one terminal of the secondary winding 158 of a transformer 160, and the anode of the triode 154 being connected through a resistor 162 to the other terminal of the secondary winding. The primary winding 164 of the transformer 160 is connected across the electromagnetic drive transducer assembly 42. A zero-center milliammeter 166 is connected between the anodes of the triodes 152 and 154.

As previously pointed out, the output signal developed by the electromagnetic pick-up transducer assembly 54 has a frequency corresponding to the out-of-phase angular vibrational frequency of the annular members 14 and 16 and about the "Y" axis, and it has an amplitude proportional to the rate of turn of the instrument about the "X" axis and a phase determined by the direction of such turn.

The primary winding 164 of the transformer 160 receives the amplifier output signal from the cathode follower 128. This signal has a constant amplitude, and it has a frequency corresponding to the vibrational frequency of the members 14 and 16 about the "Y" axis. This signal across the primary winding 164 is induced in the secondary winding 158 to be impressed on the anodes of the tubes 152 and 154.

When the turn of the instrument about the "X" axis is in a first direction, the phase relation between the output signal developed by the pick-up transducer assembly 54 and the amplifier signal developed by the cathode-follower 128 (which signals have the same frequency) is such that one of the tubes 152 and 154 is conductive and the other is non-conductive. Therefore, the meter 166 provides a reading on one side of its center position proportional to the amplitude of the signal from the pick-up transducer 54. This reading represents the rate of turn of the instrument about the "X" axis in the first direction. The meter can be calibrated directly to read "Rate of turn."

Alternately, when the turn of the instrument about the "X" axis is in the opposite direction, the phase relation between the amplifier signal and the output signal from the transducer 54 is reversed. Therefore, the conductivity of the tubes 152 and 154 is reversed so that the meter 166 is deflected on the other side of its zero point. This meter, therefore, may be calibrated directly to indicate rate of turn, and the direction of turn is indicated by the deflection of the meter on either side of its zero point. It is apparent, that when there is no turn about the "X" axis, that the meter 166 will return to its central zero position.

The electromagnetic pick-up transducer assembly 54 is also connected to the input terminal of a frequency selective amplifier and phase inverter 170. The output terminal of this amplifier is connected to one terminal of the damping electromagnetic damping transducer assembly 56, the other terminal of this transducer being grounded. The amplifier 170 is constructed in accordance with well known principles to be responsive to a wide range of signal frequencies, but to be unresponsive to the signal frequency corresponding to the resonant frequency at which the annular members 14 and 16 are driven about the "Y" axis.

Therefore, any output signals that might be developed by the pick-up transducer assembly 54 in response to spurious vibrations of the annular members 14 and 16 about the "Z" axis are fed through the amplifier 170 with inverted phase to the damping transducer assembly 56. The latter transducer produces out-of-phase vibrations of the members 14 and 16 about the "Z" axis so that such spurious vibrations of the members 14 and 16 may be effectively damped. This selective damping of the annular members 14 and 16 for vibrations about the "Z" axis is advantageous in that undesirable resonances are eliminated, and the effect of shock and vibrations about the "Z" axis is minimized.

In general, the annular members 14 and 16 have a resonant frequency for angular vibrations about the "Z" axis that is higher than the resonant frequency for angular vibration about the "Y" axis. This obtains because of the difference in stiffness of the resilient spokes 18, 20, 22 and 24 relative to bending as compared to torsion, and this is coupled with the fact that the radius of gyration of the annular members in rotation about the "Z" axis is less than the radius of gyration about the "Y" axis.

By proper design, the two resonant frequencies described in the preceding paragraph may be made widely divergent. Therefore, it is a simple matter to design the amplifier 170 so that it will reject the signal frequency corresponding to the resonant vibrational mode about the "Y" axis; and so that the amplifier will pass the signal frequency corresponding to the resonant vibrational mode about the "Z" axis.

Therefore, the illustrated arrangement functions to damp out any extraneous and undesired oscillations that might be set up in the instrument at its resonant frequency in the "Z" axis mode. At the same time, the effects of any external shocks or vibrations tending to produce rotational movement at other frequencies about the "Z" axis (except the "Y" mode resonant frequency) are effectively damped out by the transducer 56 and its associated circuit.

The embodiment of the invention shown in FIGURES 5 and 6 is essentially similar to that described in conjunction with FIGURES 1 and 2. However, the latter embodiment has certain structural differences which enable the latter embodiment to be conveniently constructed and assembled.

The embodiment of FIGURES 5 and 6 includes a base 172. A hub 173 is rigidly mounted on the base and extends through the base at right angles to the plane thereof. A first series of resilient spokes 174, 175, 176 and 177 are rigidly fastened to the hub 173. These spokes extend on one side of the base radially outwardly from the hub and at right angles to one another. The spokes are affixed to an annular member 178 and serve to support that annular member on one side of the base in coaxial relation with the central hub 173. A second group of radial spokes 180, 181, 182 and 183 are also affixed to the central hub 173 and these latter spokes extend on the other side of the base radially outwardly from the central hub 173 and directly under respective ones of the first group of spokes 174, 175, 176 and 177. A second annular member 184 is supported by the group of spokes 180, 181, 182 and 183 on the other side of the base 172 in axially spaced relation to the annular member 178 and coaxial with the central hub 173.

The spokes and annular members are preferably composed of magnetic material such as iron or steel. As in the previous embodiment, the spokes support the annular members for limited angular vibrational motion about the central hub 173.

The upper annular member 178 has a tab 185 affixed to its lower side. This tab is adjacent the peripheral edge of the member 178, and it extends downwardly in an axial direction to form a salient pole-piece. The annular member 184 has a similar tab 186 constituting a salient pole-piece. The tab 186 is affixed to the upper surface of the member 184 adjacent its peripheral edge. The tab 186 extends upwardly and in an axial direction toward the tab 185. The tabs 186 and 185 are substantially in axial alignment with one another, but they face in opposite directions.

An electromagnetic pick-up transducer assembly 187 is mounted on the base 172 and the transducer is positioned between the annular members 178 and 184. The transducer has a first salient magnetic pole-piece 188 which extends adjacent the pole-piece 185 upwardly from the base and in an axial direction to define an air gap with the pole-piece 185. The transducer has a further salient magnetic pole-piece 189 which extends downwardly from the base adjacent the salient pole-piece 186 so as to form an air gap with the latter pole-piece.

When the annular members 178 and 184 are vibrated angularly in mutually opposite directions about the hub 173, the air gaps between the pole-pieces 185, 188 and between the pole-pieces 186, 189 open and close in phase operation. This causes an alternating voltage output signal to appear across the output terminals of the pick-up transducer 187.

A similar arrangement is used to constitute the electromagnetic drive transducer assembly 190 for the annular members 178 and 184. This drive transducer assembly, as in the previous embodiment, is positioned diametrically opposite to the pick-up transducer assembly 187. This latter transducer assembly also includes salient pole-pieces (not shown) similar to the pole-pieces 185, 186, 188 and 189.

An electromagnetic pick-up transducer assembly 191 extends through and is supported by the base 172 and this assembly has a usual core whose ends 192 and 193 are spaced axially from respective ones of the annular members 178 and 184. Respective air gaps are thereby formed between the pick-up transducer assembly 191 and the annular members. As previously noted, the annular members are preferably formed of magnetic material so that any variations in these air gaps changes the flux linkage in the pickup transducer, and therefore, changes the amplitude of the output signal developed by the transducer.

An electromagnetic damping transducer assembly 194 also extends through and is supported by the base 172. The transducer 194 has a core whose ends 195 and 196 extend into operative relation with the annular members 178 and 184, and form respective air gaps, diametrically opposite the air gaps defined by the ends 192 and 193 of the core of the transducer assembly 191.

The apparatus of FIGURES 5 and 6 can, likewise, utilize the control system of FIGURE 4. Then the transducer 187 will replace the transducer 44; and the transducers 190, 191 and 194 will replace the transducers 42, 54 and 56 respectively.

In the system of FIGURE 4, the instrument is allowed to precess so as to produce vibrational rotation about the "Z" axis as the instrument is turned about the "X" axis. The amplitude of the vibrations about the "Z" axis is then measured to obtain a measurement of the rate of turn about the "X" axis.

Under some conditions it may be advantageous to inhibit such rotational vibration about the "Z" axis, and to measure the torque required to restrain this rotation to obtain an indication of the rate of turn about the "X" axis.

This latter technique would obviate any measurement errors that might arise due to non-linear action of the numbers 18, 20, 22 and 24 resulting from the flexing of these numbers about the "Y" axis combined with the twisting of the same about the "Z" axis.

This is accomplished in the system shown in FIGURE 7 in which components similar to those of the system of FIGURE 4 are represented by like numerals.

In FIGURE 7, as in FIGURE 4, the amplifier including the discharge tubes 100, 114 and 128 drives the annular members about the "Y" axis. These members, as before, are driven for out-of-phase vibrational motion about the "Y" axis at the natural resonant frequency of the instrument.

Now, any turn of the instrument about the "X" axis tends to produce rotational vibrational motion about the "Z" axis, as described previously. Such vibrational motion about the "Z" axis causes the pick-up 54 to produce a signal having a frequency corresponding to the frequency of vibration of the members 14 and 16 about the "Y" axis, and having an amplitude corresponding to the vibrational motion of these members about the "Z" axis.

The signal from the pick-up 54 is amplified in a high-gain amplifier 200 of usual construction. The amplified signal from the amplifier is then introduced to the transducer 56. This amplified signal has a phase suitable to cause the transducer 56 to restrain the rotational vibration about the "Z" axis.

Now, for a given rate of turn about the "X" axis, the transducer develops a signal having a certain amplitude. This signal is amplified by the amplifier 200 and it is applied through a resistor 202 to the transducer 56. The transducer 56 then produces a force tending to prevent rotation about the "Z" axis and which tends to reduce the amplitude of the signal generated by the pick-up 54 to zero.

It can be shown that the ampere turns of the transducer 56 required to reduce the amplitude of the signal from the pick-up 54 to zero is directly proportional to the rate of turn of the instrument about the "X" axis.

The voltage developed across the resistor 202 is directly proportional to the current flowing in the transducer 56. This voltage therefore is an accurate indication of the rate of turn of the instrument about the "X" axis.

The voltage developed across the resistor 202 is introduced to the primary winding of a transformer 204. The secondary winding of the transformer is connected in the grid circuit of the tubes 152 and 154. The secondary, therefore, applies a signal to the grids of the tubes 152 and 154 that is directly proportional to the current flow in the transducer 56 which in turn, is directly proportional to the rate of turn about the "X" axis.

The primary 164 of the transformer 160 as in the system of FIGURE 4, connected to the output terminal of the circuit of the tube 128. The circuit of the meter 166, therefore, operates in the described manner so that the meter accurately indicates the direction and rate of turn about the "X" axis.

In this latter embodiment it may be shown that:

$$T = (I_{yy}\omega_x \theta_m W_r \cos W_r t) \quad (1)$$

when:

T: Output torque.
$I_{yy}$: Moment of inertia about the "Y" axis.
$\omega_x$: Rate of turn about "X" axis.
$\theta_m$: Maximum angular amplitude of vibration of the annular members 14 and 16.
$W_r$: Resonant frequency of the numbers 14 and 16 about the "Y" axis.

The amplitude of the output signal from the pick-up 44 is proportional to the product $\theta_m W_r$. It follows therefore that the meter circuit of the system of FIGURE 7 will be insensitive to changes in the resonant frequency so long as the output signal from the drive amplifier 100, 114 and 128 is held constant as by the automatic volume control (A.V.C.) circuit described in conjunction with FIGURE 4.

The A.V.C. circuit effectively maintains the product $\theta_m W_r$ constant if, for example, the resonant frequency changes due to temperature variations. Therefore, even under widely varying ambient temperature conditions, the meter 166 continues accurately to indicate the rate of turn about the "X" axis.

The system of FIGURE 8 is similar in some respects to that of FIGURE 7 and like components have been represented by the same numerals. The embodiment of FIGURE 8, however, is independently sensitive to rates of turn about the "X" axis and about the "Z" axis. In effect, the single instrument of FIGURE 8 is made to perform the functions of two independent units.

In the latter embodiment, the annular members 14 and 16 are supported on the hub 12 by four pairs of identical resilient spokes 26, 28; 26a, 28a; 30, 32; and 30a, 32a. These pairs of spokes extend radially from the hub at right angles to one another. The spokes may all be similar to the resilient rods 26, 28 and 30, 32 of the previous embodiments.

These spokes provide equal freedom of vibration about the "Z" axis as about the "X" axis.

The transducers 42 and 44 and their associated tabs 34, 36, 38, 40 are shifted angularly by 45° on the respective annular members 14 and 16 as compared with the previous embodiments.

Transducers 56′ and 54′ respectively similar to the transducers 56 and 54; and associated tabs 52′ and 50′ and 46′ 48′ are mounted on the respective members 14 and 16 at the positions previously occupied by the transducers 42 and 44 in the previous embodiments. The transducers 54 and 56 are intercoupled in the system of FIGURE 8 through the same circuitry as was described in conjunction with FIGURE 7, and the components of that circuitry are indicated in FIGURE 8 by the same numerals as in FIGURE 7. Likewise, the transducers 54′ and 56′ are intercoupled in FIGURE 8 by circuitry similar to that described in conjunction with the transducers 54 and 56 of FIGURE 7, and similar components in the circuitry of FIGURE 8 have been designated by the same numerals with a primed designation.

The driving transducer 42 and its associated magnetic tabs are placed midway between the restraining transducers 56′ and 56 to cause a minimum of interference between the driving transducer and the restraining transducers.

Likewise, the pick-up transducer 44 is positioned midway between the pick-up transducer 54 and 54′ to reduce interference between the former and the latter two to a minimum.

In the manner described in conjunction with the system of FIGURE 7, the meter 166 will read the rate of turn about the "X" axis and the meter 166′ will read the rate of turn about the "Z" axis.

So long as the amplifier 200 and 200′ have sufficiently high gain to restrain any flexing of the spokes about the "X" or "Y" axis, the readings of the meters 166 and 166′ will be highly accurate and independent of one another.

The embodiment of the invention shown in FIGURES 9, 10 and 11 is similar to that described above in reference to FIGURES 5 and 6 except for certain structural differences that provide for a more compact and accurate instrument.

As illustrated in FIGURE 9, the embodiment includes a support structure 243 having three parallel bases 240, 241 and 242. The bases 240, 241 and 242 may be circular discs so that the structure 243 is cylindrically shaped. A hub 235 is rigidly mounted on the three bases 240, 241 and 242, extending from the base 240 through the centrally located base 241 to the base 242. The arrangement of the support structure 243 and the hub 235 forms a rigid structural arrangement. The hub 235 supports one annular member 220 on one side of the base 241 and a second annular member 222 on the other side of the base 241. The member 220 is supported on four spokes, not shown, and the member 222 is supported on four spokes 236 to 239. As in the previous embodiments the spokes support the annular member 220 and 222 for limited angular vibrational motion about the hub 235.

The three layered support structure 243 provides for a rigid support at the ends of the hub 235 as well as its center. Accelerations along the "X" axis, accordingly, do not flex or bend the hub 235. In the embodiment of FIGURES 5 and 6, the hub 173, which is only centrally supported, may flex under strong accelerations and introduce an error in the output signal. By supporting the ends of the hub 235 in FIGURE 9 as well as its center, such errors are avoided.

The annular members 220 and 222 and the four spokes supporting each of the members 220 and 222 are made of a non-magnetic material. Four magnetic tabs 230 to 233 are provided at the internal surface of each of the members 220 and 222. The tabs 230 to 233 may be welded or brazed to the members 220 and 222. By providing the tabs on the inside of the annular members 220 and 222 instead of on the outside, a more compact arrangement is achieved. The two tabs 231 and 233 may be utilized as drivers and the two tabs 232 and 230 may be utilized as sensors for each of the two members 220 and 222.

FIGURE 11 in particular illustrates the transducer means for vibrating the magnetic tab 233 of the annular member 222. An H-shaped magnetic structure 260 extends between the tabs 233 on the two annular members 220 and 222. The ends of the H shape are positioned on either side of the two tabs 233 to provide air gaps therebetween. A central member 262 of the structure 260 is made of material having permanent magnetic properties such as Alnico 5. The rest of the H-shaped structure 260 is made of a ferromagnetic material such as iron or steel. In addition to the H-shaped magnetic structure 260 associated with the two tabs 233, an electromagnetic member, including a winding 265 and a core 264, is provided extending between the two magnetic tabs 233. The magnetic structure 260 and the core 264 are supported on the central base 241 and extend through an opening 294 in the base 241. Though not shown, a structure 260 may be utilized which extends between the bases 240 and 242 so as to be supported by all three bases.

The winding 265 is energized by an A.C. signal illustratively between 2,500 and 3,000 cycles per second to drive the two tabs 233 in opposite directions back and forth between the ends of the H-shaped structure 260. When the end of the core 264 of the member 222 is magnetized in one direction, the tab 233 of the member 222 is forced to the right in FIGURE 11, and when the end of the core of the member 265 is magnetized in the opposite direction, the tab 233 of the member 222 is forced to the left. The forces on the tab 233 of the member 220 are in a direction opposite to those on the tab 233 of the member 222 so the two annular members 220 and 222 are vibrated back and forth in opposite directions about the hub 235.

Similar transducing means are provided for the tabs 230 to 232. The A.C. signals to the transducing means associated with the tabs 233 and 231 are out-of-phase so that the driving forces complement each other. The transducing means magnetically coupled to the two tabs 230 and 232 function as sensors and the signal produced from one of the sensors is inverted and added to the other. The inverter and adding circuits, which are not shown, may be conventional. If desired only a single tab may be used for the torquing function and a single tab for the sensing function for each of the members 220 and 222.

In addition to the four internal tabs 230 to 233, each of the annular members 220 and 222 has two external magnetic tabs 225 and 224. The two tabs 225 together with a transducer means 270 function as the rate pick-up or sensing apparatus and the two tabs 224 together with a transducer means 271 function as a rate damping or torquing apparatus. The transducing means 270 and 271 may be supported on the base 241. The transducer means 270 and 271 function in a manner quite similar to the transducers 191 and 194 in FIGURE 6 or the transducers 54 and 56 in FIGURE 1. The apparatus of FIGURES 9 to 11 can, accordingly, be utilized in control systems of the type illustrated in FIGURES 4 and 7.

The invention provides, therefore, an improved gyroscopic instrument for measuring or indicating inertial angular velocities. The instrument is rugged and reliable in its construction and, to all intents and purposes, is insensitive to shocks and vibrations along or about any axis.

Moreover, the instrument is extremely precise and accurate; and it and its accosiated components are relatively simple and inexpensive in their construction, and are relatively easy to operate and maintain.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. An inertial angular velocity sensing instrument including, a base, a hub rigidly mounted on the base, a pair of coaxial annular members mounted on the hub axially spaced from one another and supported on the hub for vibratory angular motion about the central axis thereof, said coaxial annular members being so mounted on the hub by a plurality of resilient radial spokes extending outwardly from the hub and affixed to the hub and to respective ones of the annular members, driving means for imparting such vibratory angular motion to said annular members about said central axis of the hub in mutually opposite directions and at a predetermined frequency, pick-up means positioned at adjacent points on the respective peripheries of said annular members for providing an indication of the relative motion of such points towards and away from each other in a direction parallel to said central axis, and means coupled to said pick-up means for utilizing the indications therefrom to sense the rate of turn of said annular members about an axis perpendicular to said central axis.

2. An inertial angular velocity sensing instrument including, a base, a hub rigidly mounted on the base and extending outwardly from the plane thereof, a pair of coaxial annular members mounted on the hub axially spaced from one another and supported on the hub for vibratory angular motion about the central axis thereof, electro-magnetic driving means for imparting such vibratory angular motion to said annular members about said central axis in mutually opposite directions and at a predetermined frequency, a pair of radial tabs of magnetic material mounted on respective ones of said annular members in substantial axial alignment and extending radially from said members in spaced parallel relation, magnetic means and associated winding means positioned between said tabs for developing an output signal varying in accordance with the relative motion of said tabs towards and away from each other in correspondence with the rotational movement of said members about a second axis perpendicular to said central axis, and means for utilizing said output signal to sense the rate of turn of said anular members about a third axis perpendicular to said central and second axes.

3. An inertial angular velocity sensing instrument including, a base, a hub rigidly mounted on the base and extending outwardly from the plane thereof, as pair of coaxial annular members mounted on the hub axially spaced from one another and supported on the hub for vibratory angular motion about the central axis thereof, said coaxial annular members being so mounted on the hub by a plurality of resilient radial spokes extending outwardly from the hub and affixed to the hub and to respective ones of the annular members, electro-magnetic driving means positioned adjacent the peripheries of said anular members for imparting such vibratory angular motion to said annular members about said central axis in mutually opposite directions, electro-magnetic control means positioned adjacent the peripheries of said annular members diametrically opposite to said driving means for controlling the frequency of said vibratory angular motion of said members about said central axis, pick-up means positioned at a selected point adjacent the peripheries of said annular members angularly displaced from said driving and control means, said pick-up means providing an indication of the relative angular motion of said annular members about a second axis perpendicular to said central axis, and means coupled to said pick-up means for utilizing the indications therefrom to sense the rate of turn of said annular members about a third axis extending from the center of said annular members through said selected point on the peripheries thereof.

4. An inertial angular velocity sensing instrument including, a base, a hub rigidly mounted on said base, a pair of coaxial annular members, a plurality of resilient spokes mounted on said hub affixed to said hub and to respective ones of the annular members and supporting said annular members in axially spaced relation for vibratory angular motion about the axis of said hub, electro-magnetic driving means positioned at the peripheries of said annular members for imparting such vibratory angular motion thereto about said axis of said hub in mutually opposite directions and at a predetermined frequency, pick-up means positioned at a selected point on the peripheries of said annular members to provide an indication of the relative angular motion of said annular members about a second axis perpendicular to said axis of said hub, and means coupled to said pick-up means for utilizing the indications therefrom to sense the rate of turn of said base about a radial axis extending from the axis of said hub through said selected point on the peripheries of said annular members.

5. The instrument defined in claim 4 and which further includes damping means positioned at the peripheries of said annular members diametrically opposite to said pick-up means for suppressing vibratory motion of said annular members about said second axis at frequencies other than said predetermined frequency.

6. An inertial angular velocity sensing instrument including, a base, a hub rigidly mounted on said base and extending along a first axis, a pair of annular members to be supported in axially spaced relation coaxial with said first axis for individual vibratory angular motion about said first axis, a first pair of resilient spokes mounted on said hub and extending radially therefrom to respective ones of said annular members essentially along a second axis perpendicular to said first axis, a second pair of resilient spokes mounted on said hub and extending radially therefrom to respective ones of said annular members along said second axis in diametrically opposite relation to said first pair of spokes, a first pair of substantially parellel spaced tabs of magnetic material respectively affixed to the peripheries of said annular members on opposite sides of said second axis and extending radially from said annular members in respective planes parallel to the plane defined by said first and second axes, electro-magnetic driving means positioned between said tabs for imparting such vibratory angular motion to said annular members about said first axis, second pair of substantially parallel spaced tabs of magnetic material respectively affixed to the peripheries of said annular members angularly spaced from the first pair of tabs on opposite sides of a third axis, said third axis extending radially from said hub to the peripheries of said annular member and said second pair of tabs extending in respective planes perpendicular to the plane defined by said first and second axes, and electro-magnetic pick-up means positioned between said second pair of tabs for developing a signal indicative of the relative angular rotation of said annular members about said second axis.

7. The instrument defined in claim 6 and which includes a third pair of spaced and parallel tabs of magnetic material affixed to respective ones of said annular members diametrically opposite said first pair of and extending radially from said annular members in planes parallel to the plane defined by said first and second axes, and electro-magnetic pick-up means positioned between said second pair of tabs.

8. The instrument defined in claim 7 and which includes a fourth pair of spaced and parallel tabs of magnetic material affixed to respective ones of said annular members diametrically opposite said second pair and extending radially from said annular members in respective planes perpendicular to the plane defined by said first and second axes, and electro-magnetic drive means positioned between said fourth pair of tabs.

9. The instrument defined in claim 6 and which includes a third pair of spokes extending from said hub to respective ones of said annular members, and a fourth pair of spokes extending from said hub to respective ones of said annular members, said third and fourth pairs of spokes extending in diametrically opposite relation substantially along said third axis.

10. An inertial angular velocity sensing instrument including, a base, a hub rigidly mounted on said base and extending along a first axis, a pair of annular members to be supported on opposite sides of said base in axially spaced relation coaxial with said first axis for individual vibratory angular motion about said first axis, a first axis, a first pair of resilient spokes mounted on said hub and extending radially therefrom on opposite sides of said base to respective ones of said annular members essentially along a second axis perpendicular to said first axis, a second pair of resilient spokes mounted on said hub and extending radially therefrom on opposite sides of said base to respective ones of said annular members along said second axis in diametrically opposite relation to said first pair of spokes, a first pair of tabs of magnetic material formed on respective ones of said annular members adjacent the respective points of contact of said first pair of spokes with said annular members, said first pair of tabs extending from said annular members, electro-magnetic driving means mounted on said base and having pole-pieces extending into respective operative relation with said tabs for imparting such vibratory angular motion to said annular members about said first axis, and electro-magnetic pick-up means mounted on said base at a position displaced angularly from said electro-magnetic driving means.

11. The instrument defined in claim 10 and which includes a third pair of spokes extending from said hub to respective ones of said annular members, and a fourth pair of spokes extending from said hub to respective ones of said annular members, said third and fourth pair of spokes extending in diametrically opposite relation along an axis displaced angularly from said second axis.

12. The instrument defined in claim 10 and which includes a second electro-magnetic pick-up means extending through said base and defining respective air gaps with the facing surfaces of said annular members, and which includes second electro-magnetic drive means extending through said base diametrically opposite to said second pick-up means and defining respective air gaps with the facing surfaces of said annular members, said second pick-up means and said second drive means being angularly displaced about the axis of said hub with respect to said first-named driving means and said first-named pick-up means.

13. An inertial angular velocity sensing device including, a base, a hub rigidly mounted on the base, a pair of members supported on the hub axially spaced from one another in coaxial relationship with the central axis of the hub for vibratory angular motion about the central axis, said members being supported on the hub by a plurality of resilient spokes extending radially outward from the hub and affixed to the hub and to respective ones of the members, means for imparting out-of-phase vibratory angular motion to said members about said axis, pick-up means positioned adjacent said members and coupled thereto for providing indications of any tendency for relative rotational motion of said members about a second axis different from said central axis, electro-magnetic means coupled to said members and electrically connected to said pick-up means for utilizing the indications therefrom to restrain such relative rotational motion of said members about said second axis, and means for measuring the electric current drawn by said electro-magnetic means to sense the rate of turn of said members about third axis different from said central and second axis.

14. An inertial angular velocity sensing device including, a base, a hub rigidly mounted on the base, a pair of annular members resiliently supported on the hub axially spaced from one another and positioned in coaxial relationship with the central axis of the hub for vibratory angular motion about the central axis, said annular members being supported on the hub by a plurality of resilient spokes extending radially outward from the hub and affixed to the hub and to respective ones of the annular members, electro-magnetic means for imparting out-of-phase vibratory angular motion to said members about said axis, control means including electro-magnetic pick-up means positioned adjacent to said annular members and coupled to said members for providing a signal indicative of any tendency for relative rotational motion of said members about a second axis perpendicular to said central axis, electro-magnetic transducer means positioned adjacent said annular members and coupled thereto for utilizing the signal from said control means to restrain such relative rotational motion of said members about said second axis, and means for utilizing the current flow in said electro-magnetic transducer means to obtain an indication of the rate of turn of said members about a third axis perpendicular to said central axis and to said second axis.

15. An inertial angular velocity sensing device including, a base, a hub rigidly mounted on the base, a pair of annular members resiliently supported on the hub axially spaced from one another and positioned coaxial with the central axis of the hub for vibratory angular motion about the central axis, said annular members being supported on the hub by a plurality of resilient spokes extending radially outward from the hub and affixed to the hub and to respective ones of the annular members, electro-magnetic means coupled to said annular members for imparting out-of-phase vibratory angular motion to said members about said axis, first control means including first pick-up means coupled to said annular members at a selected angular position with respect thereto for providing a signal indicative of any tendency for relative rotational motion of said members about a second axis extending radially from the hub perpendicular to said central axis and angularly spaced from the selected position of the first pick-up means by 90 degrees, first electro-magnetic transducer means positioned adjacent said annular members diametrically opposite the first pick-up means and coupled to said annular members for utilizing the signal from said first control means to restrain such relative rotational motion of said members about said second axis, first meter means for utilizing the current flow in said first electro-magnetic transducer means to obtain an indication of the rate of turn of said members about a third axis perpendicular to said central axis and angularly displaced from said second axis, second control means including second pick-up means positioned adjacent said annular members at a position corresponding to the angular position of said second axis and coupled to the annular members for providing a signal indicative of any tendency for relative rotational motion of said members about said third axis, second electro-magnetic transducer means positioned diametrically opposite said second pick-up means and coupled to said annular members for utilizing the signal from said second control means to restrain such relative rotational motion of said members about said third axis, and second meter means for utilizing the current flow in said second electro-magnetic transducer means to obtain an indication of the rate of turn of said members about said second axis.

16. The combination defined in claim 15 in which said third axis is angularly displaced by ninety degrees from said second axis and said first named electro-magnetic means is angularly spaced by substantially forty-five degrees from the second and third axes.

17. An inertial angular velocity sensing instrument including, a base, a hub rigidly mounted on the base, a pair of coaxial annular members mounted on the hub axially spaced from one another and supported on the hub for vibratory angular motion about the central axis thereof, said coaxial annular members being so mounted on the hub by a plurality of resilient radial spokes extending outwardly from the hub and affixed to the hub and to respective ones of the annular members, electro-magnetic driving means between the spokes mounting said annular members on the hub for imparting a vibratory angular motion to said annular members about said central axis of the hub in mutually opposite directions and at a predetermined frequency, pick-up means positioned at adjacent points on the respective peripheries of said annular members for providing an indication of the relative motion of such points towards and away from each other in a direction parallel to said central axis, and means coupled to said pickup means for utilizing the indications therefrom to sense the rate of turn of said annular members about an axis perpendicular to said central axis.

18. An inertial angular velocity sensing instrument including a support structure having three parallel bases, a hub rigidly mounted at its ends by two of the bases an dat its center by the third of the bases, a first annular member mounted on the hub between two of the bases on one side of the center of the hub, a second annular member mounted on the hub between two of the bases on the other side of the center of the hub, said first and said second annular members being so mounted on the hub by a plurality of resilient radial spokes extending from the hub and affixed to the hub and to respective ones of the annular members, driving means for imparting vibratory angular motion to said first and said second annular members about said central axis of the hub in mutually opposite directions and at a predetermined frequency, pick-up means positioned at adjacent points on the respective peripheries of said annular members for providing an indication of the relative motion of such points towards and away from each other in a direction parallel to said central axis, and means coupled to said pick-up means for utilizing the indications therefrom to sense the rate of turn of said annular members about an axis perpendicular to said central axis.

19. An inertial angular velocity sensing instrument including a support structure having three parallel bases, a hub rigidly mounted at its ends by two of the bases and at its center by the third of the bases, a first annular member mounted on the hub between two of the bases on one side of the center of the hub, a second annular members monuted on the hub between two of the bases on the other side of the center of the hub, said first and said second annular members being so mounted on the hub by a plurality of resilient radial spokes extending from the hub and affixed to the hub and to respective ones of the annular members, electro-magnetic driving means between the spokes mounting said annular members on the hub for imparting a vibratory angular motion to said annular members about said central axis of the hub in mutually opposite directions and at a predetermined frequency, pick-up means positioned at adjacent points on the respective peripheries of said annular members for providing an indication of the relative motion of such points towards and away from each other in a direction parallel to said central axis, and means coupled to said pick-up means for utilizing the indications therefrom to sense the rate of turn of said annular members about an axis perpendicular to said central axis.

References Cited in the file of this patent

UNITED STATES PATENTS

| | | |
|---|---|---|
| 2,455,939 | Meredith | Dec. 14, 1948 |
| 2,514,250 | Meredith | July 4, 1950 |
| 2,544,646 | Barnaby et al. | Mar. 13, 1951 |
| 2,683,596 | Morrow et al. | July 13, 1954 |
| 2,817,779 | Barnaby et al. | Dec. 24, 1957 |

FOREIGN PATENTS

| | | |
|---|---|---|
| 611,011 | Great Britain | Oct. 25, 1948 |